UNITED STATES PATENT OFFICE

2,513,002

STABILIZATION OF CROPS

Joseph A. Chenicek, Riverside, Ill., assignor to Universal Oil Products Company, Chicago, Ill., a corporation of Delaware No Drawing. Application March 27, 1947, Serial No. 737,718

11 Claims. (Cl. 99—154)

This invention relates to the stabilization of crops and more particularly to a novel method of preserving the desirable qualities thereof.

It has been found that the drying of crops either in the field or in drying equipment results in a loss of valuable food accessory factors. For example, alfalfa loses anywhere from 45% to 85% of its carotene value during the drying treatment. Similarly, carotene is found in sweet potatoes and in other yellow pigmented plants. Vitamin $B_1$ (thiamine hydrochloride) is found in various seeds, grains, nuts, legumes, fruits and vegetables, while vitamin $B_2$ (riboflavin) is found in wheat germ and leafy vegetables. Nicotinic acid (Niacin) is found in wheat germ and in several green leafy vegetables, while vitamin $B_6$ (pyridoxine) is found in whole grain cereals, crude cane molasses, etc. Vitamin C (ascorbic acid) is found in citrus fruits, tomatoes, green peppers and various other fresh fruits and vegetables, and vitamin E is found in wheat germ oil, cotton seed oil, green leafy vegetables and various grains. Vitamin $K_1$ is found in alfalfa, spinach, and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfalfa, kale, etc. It is understood that the above is merely a brief reference to the vitamin content of various crops and that these and other crops may also contain other vitamins as, for example, spinach contains vitamins A, $B_2$ later known as vitamin G (riboflavin) and C, beets contain vitamin $B_1$, potatoes contain vitamin $B_2$, parsley, cabbage, and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernel, olive, castor, peanut, rapeseed, cotton seed, corn, soy bean, etc. Alcohols are found in cockfoot grass, wheat, lucerne leaf, etc. Various sterols are found in plant oils, ergosterol, for example, being found in soya bean oil. Further, crops may become rancid and lose desirable qualities such as taste, odor, retention of physical shape (non-wilting), etc., due to oxidative deterioration.

The present invention offers a novel method of preventing or retarding the oxidative deterioration of these substances in storage and during manufacture.

In one embodiment the present invention relates to a process for stabilizing crops subject to oxidative deterioration which comprises adding thereto an inhibitor comprising an aromatic amino compound selected from the group consisting of a p-phenylene diamine and a p-aminophenol.

In a specific embodiment the present invention relates to stabilizing forage crops subject to oxidative deterioration which comprises spraying said crops with an inhibitor comprising an aromatic amino compound selected from the group consisting of a p-phenylene diamine and a p-aminophenol.

In a more specific embodiment the present invention relates to a process for stabilizing alfalfa which comprises spraying alfalfa with an inhibitor comprising an alcoholic solution of N-n-butyl-p-aminophenol.

In still another specific embodiment the present invention relates to a process for stabilizing alfalfa which comprises spraying alfalfa with an inhibitor comprising N-N'-di-secondary-butyl-p-phenylene diamine.

The term "crops" as used in the present invention is intended to include any substance grown from the soil to be used as a food for humans or animals, either in the form as gathered from the field or after suitable modification in form, such as by pressing, grinding, pulverizing, slurrying, making into paste, flour, etc., either used as such or after suitable cooking. Thus the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsley, cabbage, etc.; fruits including both small fruits and those grown on trees, such as berries, oranges, lemons, grapefruit, apples, bananas, melons, dates, figs, etc.; nut crops including peanuts, walnuts, pecans, almonds, chestnuts, hazel nuts, etc.; hops, coffee, tea, sugar, etc. Also included are crops such as tobacco, which although are not actually consumed as such, are chewed and the oils therefrom are allowed to enter into the system. It is understood that the above crops are merely typical representatives and that the broad scope of the present invention is not intended to be unduly limited to the crops specifically mentioned but is to include all other crops subject to oxidative deterioration.

In the stabilizing of alfalfa, for example, it has been found preferable to utilize an inhibitor which is not water soluble so that the inhibitor will not be washed away by the rain. The inhibitors of the present invention are not water soluble and therefore are particularly suitable for this purpose. In addition, these inhibitors are wax soluble and therefore will penetrate through the waxy coating of various crops and will enter into the cells of the crops to effect stabilization of the oils therein.

The inhibitors of the present invention comprise an aromatic amino compound selected from the group consisting of p-phenylene diamines and p-aminophenols. While unsubstituted p-phenylene diamine may be employed within the broad scope of the present invention, preferred inhibitors comprise p-phenylene diamines in which at least one of the amino hydrogens is replaced by an alkyl radical. A particularly preferred inhibitor comprises N-N'-di-secondary-butyl-p-phenylene diamine, although it is understood that inhibitors containing methyl, ethyl, propyl, butyl, tertiary-butyl, amyl, etc., radicals attached to one or both of the nitrogen atoms may be employed. Also comprised within the scope of the present invention are inhibitors in which the alkyl radicals attached to the nitrogen atoms are different, as for example, in compounds such as N-propyl-N'-butyl-p-phenylene diamine, N-butyl-N'-amyl-p-phenylene diamine, etc.

Similarly, while unsubstituted p-aminophenol may be employed within the broad scope of the present invention, it is preferred that one of the hydrogens attached to the nitrogen atom is substituted by an alkyl radical. A particularly preferred inhibitor comprises N-n-butyl-p-aminophenol, while other satisfactory inhibitors include N-iso-propyl-p-aminophenol, N-secondary-butyl-p-aminophenol, N-amyl-p-aminophenol, etc. During the manufacture of N-n-butyl-p-aminophenol, a minor proportion of N-N'-di-butyl-p-phenylene diamine is formed and it is within the scope of the present invention to use this mixture as a suitable inhibitor for the stabilization of crops.

It is understood that the various inhibitors which may be used within the broad scope of the present invention are not necessarily equivalent in their activity but that they all will serve to stabilize the crops to some degree.

In a preferred embodiment of the invention the inhibitor is sprayed or dusted on the crops either before or after cutting. For spraying, N-N'-di-secondary-butyl-p-phenylene diamine, which is a liquid under atmospheric conditions, may be utilized as such. However, N-n-butyl-p-aminophenol is a solid at atmospheric conditions and therefore is dissolved in a suitable non-toxic organic solvent or is emulsified with a suitable wetting agent. However, it is also understood that the p-phenylene diamine inhibitors may likewise be made up as solutions or emulsions. As these inhibitors are soluble in almost all organic solvents, the particular solvent to be used in any given instance will depend primarily upon the effect the solvent may have on the crops, and secondary on the cost. A light hydrocarbon naphtha or kerosene which is volatile and thus will evaporate to leave the inhibitor absorbed in the crops may be employed, although alcohols, ethers, aldehydes, ketones, etc., which meet the desired requirements, may be used. Particularly suitable solvents for N-n-butyl-p-aminophenol comprise methyl alcohol, ethyl alcohol, propyl alcohol, butyl alcohol, or a mixture of a minor proportion of methyl alcohol and a major proportion of isopropyl alcohol. When utilized as an emulsion, the inhibitor may be commingled with a wetting agent such as Aerosol, Nacconol, Santomerse, etc. or those of the gardinol type and, in fact, with any suitable non-toxic wetting agent. In still another embodiment the inhibitor may be emulsified with water and then used as a spray or made in a solution with the various solvents hereinbefore set forth and then emulsified with the wetting agent, with or without a solutizing agent, and utilized as such or in a solution or emulsion with water. For dusting, the inhibitor or a solution or emulsion thereof as hereinbefore set forth may be admixed with suitable inert material, such as clays.

The inhibitor may be sprayed or dusted by hand or from aeroplanes or by any other suitable method in order to distribute the inhibitor in finely divided particles over the crops, either as droplets or as finely divided solid particles. The inhibitor will penetrate throughout and within the leaves, seeds, etc., of the crops and will thereby serve to preserve the desirable qualities, not only of the leaves themselves, but also of the oils and the like obtained from the crops. Similarly, the inhibitor will penetrate into the larger produce such as oranges, lemons, melons, apples, pears, etc., and thereby will serve to preserve the vitamin content and other desirable properties thereof.

The inhibitors may be sprayed or dusted alone or in combination with insect or weed killing materials. In some cases, the insect or weed killing material may serve as a solvent for the inhibitor as, for example, when it is desired to use a hydrocarbon fraction, such as kerosene, for this purpose.

It is understood that the spraying or dusting of the crops may be done while the crops are in the field, either prior to or after cutting, or that the inhibitor may be applied after the crops have been gathered and stored. The amount of inhibitor to be applied to the crops may vary considerably, but in general will range from about 0.0001% to about 0.1% by weight of active ingredient.

The following examples are introduced to illustrate further the novelty and utility of the present invention but not with the intention of unduly limiting the same.

The following table illustrates the beneficial results obtained by treating alfalfa with two inhibitors of the present invention. Inhibitor A comprised N-N'-di-secondary-butyl-p-phenylene diamine and inhibitor B comprised a mixture of 42% by weight of N-n-butyl-p-aminophenol, 6% by weight of N-N'-di-n-butyl-p-phenylene diamine and 52% by weight of an alcohol solvent comprising a mixture of a minor volume of methyl alcohol and a major volume of isopropyl alcohol. The alfalfa used contained 28.0 mg. of carotene per 100 grams of alfalfa. In order to assist in distributing the small amount of inhibitor throughout the alfalfa, the inhibitor was added as a solution in a hydrocarbon fraction comprising a mixture of pentanes and hexanes. The sample of alfalfa to be used as a blank or control run (no addition of inhibitor) was similarly treated with the same amount of the hydrocarbon fraction in order to show that the improved results were not due to the hydrocarbon solvent used.

TABLE I

| Inhibitor | Per cent Active Inhibitor (Based on weight of alfalfa) | Per cent of Carotene lost at the end of 7 weeks Temperature | |
|---|---|---|---|
| | | 75° F. | 125° F. |
| None | | 50.0 | 77.2 |
| A. (N-N'-di-secondary-butyl-p-phenylene diamine) | 0.25 | 6.8 | 22.0 |
| | 0.10 | 6.1 | 35.0 |
| B. (N-n-butyl-p-aminophenol-N-N'-di-n-butyl-p-phenylene diamine) | 0.25 | 7.9 | 25.5 |
| | 0.10 | 6.1 | 47.2 |

It will be noted from the above data that inhibitor A reduced the carotene loss in the alfalfa stored at 75° F. from 50% to about 6–7%, and in the alfalfa stored at 125° F. from 77.2% to 22–35%. Similarly, it will be noted that inhibitor B decreased the carotene loss to 6–8% in the alfalfa stored at 75° F. and to 25–47% in the alfalfa stored at 125° F.

I claim as my invention:

1. A process for stabilizing carotene-containing crops subject to oxidative deterioration which comprises applying thereto an inhibitor comprising an aromatic amino compound selected from the group consisting of a p-phenylene diamine and a p-aminophenol.

2. A process for stabilizing carotene-containing crops subject to oxidative deterioration which comprises applying thereto an inhibitor comprising N-N'-di-secondary-butyl-p-phenylene diamine in an amount sufficient to retard said deterioration.

3. A process for stabilizing carotene-containing crops subject to oxidative deterioration which comprises applying thereto an inhibitor comprising N-n-butyl-p-aminophenol in an amount sufficient to retard said deterioration.

4. A process for stabilizing carotene-containing crops subject to oxidative deterioration which comprises distributing over the crops finely divided particles of an inhibitor comprising an aromatic amino compound selected from the group consisting of a p-phenylene diamine and a p-aminophenol.

5. A process for stabilizing alfalfa to prevent loss in carotene content which comprises spraying the alfalfa with an inhibitor comprising a p-phenylene diamine.

6. The process of claim 5 further characterized in that said inhibitor comprises N-N'-di-secondary-butyl-p-phenylene diamine.

7. A process for stabilizing alfalfa to prevent loss in vitamin content which comprises spraying the alfalfa with an inhibitor comprising a p-aminophenol.

8. The process of claim 7 further characterized in that said inhibitor comprises N-n-butyl-p-aminophenol.

9. A method for stabilizing alfalfa against loss of carotene content which comprises applying to the alfalfa an inhibitor comprising an aromatic amino compound selected from the group consisting of a p-phenylene diamine and a p-aminophenol.

10. Crops having a carotene content normally subject to oxidative deterioration and containing as an inhibitor against said deterioration an aromatic amino compound selected from the group consisting of a p-phenylene diamine and a p-aminophenol.

11. Alfalfa containing as an inhibitor against oxidative deterioration of its carotene content an aromatic amino compound selected from the group consisting of a p-phenylene diamine and a p-aminophenol.

JOSEPH A. CHENICEK.

REFERENCES CITED

The following references are of record in the file of this patent:

UNITED STATES PATENTS

| Number | Name | Date |
|---|---|---|
| 1,675,631 | Baldsiefen et al. | July 3, 1928 |
| 1,745,604 | Christiansen et al. | Feb. 4, 1930 |
| 1,752,933 | Sullivan, Jr. | Apr. 1, 1930 |
| 2,038,632 | Bennett et al. | Apr. 28, 1936 |
| 2,233,172 | Loane | Feb. 25, 1941 |